Patented Feb. 25, 1941

2,232,933

UNITED STATES PATENT OFFICE 2,232,933

THERMOSTABLE POLYMERIC COMPOSITION

Ralph M. Wiley and John E. Livak, Midland, Mich., assignors to The Dow Chemical Company, Midland, Mich., a corporation of Michigan No Drawing. Application April 10, 1939,
Serial No. 267,169

11 Claims. (Cl. 260—36)

This invention relates to compositions of matter comprising polymeric vinylidene chloride products or polymeric vinyl chloride products and plasticizers therefor capable of lowering the softening points of the polymers while increasing their toughness and resistance to thermal decomposition.

The polymers of vinylidene chloride and those of vinyl chloride, as well as co-polymers containing substantial amounts of these materials may be molded to produce useful products. One drawback has been that the said polymers tend to decompose and darken when molded at temperatures above their respective softening points. Attempts have been made to avoid this difficulty by adding plasticizers to the polymers in order to lower the temperature at which they can be molded. This practice has resulted ordinarily in softening the polymer unduly and prevents application of the polymeric composition to many fields in which it could be employed if the inherent toughness of the polymer were not destroyed. Most plasticizers have little, if any, heat stabilizing effect on the polymer of vinylidene chloride or vinyl chloride or on the co-polymers of these materials with other polymerizable compounds.

It is an object of the present invention to provide polymeric products comprising as a major component thereof vinylidene chloride or vinyl chloride which are resistant to thermal decomposition at temperatures sufficiently above the softening point of the respective polymers so that the composition may be readily worked while in a plastic state. It is a further object of the invention to provide compositions comprising polymeric or co-polymeric vinylidene chloride or vinyl chloride plasticized with compounds capable of lowering the softening point of the polymer while increasing their toughness and their resistance to thermal decomposition as compared with like properties of these polymeric bodies containing the usual plasticizers.

It has now been found that the foregoing objects may be attained by incorporating in the polymer or co-polymer of vinyl chloride or vinylidene chloride a "di-aralkyl ether of the benzene series" or an "aralkyl ether of a nuclear hydroxylated aromatic compound of the benzene series." Examples of the aralkyl ethers which may be employed for the present purpose include di-(alpha-phenyl-ethyl) ether, dibenzyl ether, the benzyl ether of cellosolve salicylate, benzyl ether of cellosolve-ortho-cresotinate, benzyl ether of ortho-xenyl salicylate, benzyl ether of carvacryl salicylate, benzyl ether of beta-phenoxy-ethyl salicylate, benzyl ether of the ethyl ester of 3-phenyl salicylic acid, para-chloro-benzyl ether of di-tertiary-amyl phenol, para-chloro-benzyl ether of ethyl salicylate, benzyl ether of 2-acetyl-4-phenyl-6-chloro-phenol, benzyl ether of 2.4.6-tri-hydroxy-3-chloro-diphenyl, and the like. These compounds typify a group of plasticizers, stabilizers, and toughening agents for polymeric vinylidene chloride products and vinyl chloride products which may be referred to generically as being selected from the group consisting of "di-aralkyl ethers of the benzene series and aralkyl ethers of nuclear hydroxylated aromatic compounds of the benzene series."

The amount of aralkyl aromatic ether employed may vary widely with the type of co-polymer to which it is added and the properties desired in the plasticized product. In general, from 1 to 40 per cent of the plasticizer may be employed based on the weight of the polymer or co-polymer in which it is to be incorporated. When it is desired simply to stabilize the polymer against thermal decomposition at temperature slightly above the softening point thereof, the amount of the new plasticizing agents will ordinarily vary from about 1 to 10 per cent. When, however, it is desired to produce a polymeric product of a highly plastic nature which has a lower softening point than the unplasticized polymer, which retains an unusually large proportion of the toughness of the unplasticized product, and which is stabilized against thermal decomposition, the amount of plasticizer employed may vary from about 5 to 40 per cent.

The following examples illustrate the practice of the invention:

Example 1

10 parts by weight of di-(alpha-phenyl-ethyl) ether and 90 parts of a co-polymer consisting of 90 per cent vinylidene chloride and 10 per cent of vinyl chloride was ground in a ball mill until the polymeric composition readily passed through a 40 mesh screen. The so-formed plasticized molding powder was molded into preformed pellets at room temperature and under moderate pressure. The preforms were molded to desired shape and size in a chromium plated die at 160° C., temperature and pressure being maintained for about 5 minutes. The resulting product was colorless and nearly transparent. It had a tensile strength of 4600 pounds per square inch of cross section, an impact value of 2.2 inch pounds, and a softening point of about 155° C. By way of contrast, the unplasticized polymer when molded under like conditions turned black, had an impact value of only 1.3 inch pounds and a softening point of 171° C.

*Example 2*

The benzyl ether of butyl-cellosolve salicylate was substituted for the di-(alpha-phenyl-ethyl) ether of Example 1 and the composition was ground, preformed, and molded under identical conditions. The molded product had a tensile strength of 4700, an impact value of 2.4 inch pounds, and was extremely light colored, exhibiting no evidence of decomposition.

By way of contrast with each of the foregoing examples, when tricresyl phosphate, a commonly employed plasticizer, was used rather than one of the herein-described aralkyl ethers, the molded product had a very dark brown color indicating that considerable decomposition had taken place. The molded article had an impact value of only 1.9 inch pounds and a softening point of about 162° C.

*Example 3*

A co-polymer of about 85 per cent vinylidene chloride and 15 per cent ethyl acrylate was plasticized with 5 per cent of its weight of benzyl ether of cellosolve ortho-cresotinate. When this composition was molded, light colored products were obtained which were tough and resilient in character and exhibited no evidence of thermal decomposition even when molded at temperatures from 15 to 20 centigrade degrees above the softening point of the composition.

*Example 4*

Polymeric vinyl chloride having a softening point of about 180° C. was compounded with 10 per cent of its weight of the benzyl ether of cellosolve salicylate. The composition had a softening point of about 160° C. and could be molded to produce tough, substantially colorless articles at temperatures from 160° C. to 180° C. without evidence of decomposition.

*Example 5*

In a manner similar to that outlined in the foregoing examples, a co-polymer of vinyl chloride and vinyl acetate was prepared and stabilized by the incorporation of 20 per cent of di-(alpha-phenyl-ethyl) ether. The so-formed composition had a softening point substantially below that of the original co-polymer and when molded at temperatures above the said softening point yielded light colored articles of improved toughness and resistance to thermal decomposition.

*Example 6*

Monomeric vinylidene chloride was mixed with about 30 per cent of its weight of di-(alpha-phenyl-ethyl) ether. The mixture was subjected to a polymerization in the presence of about 1 per cent of benzoyl peroxide as catalyst at a temperature of approximately 45° C. The polymeric product was freed from remaining monomer and found to contain about 40 per cent of plasticizer based on the weight of polymeric vinylidene chloride present. This composition molded readily at temperatures near 140° C. with no evidence of thermal decomposition.

From the foregoing examples, it is clear that the new plasticizers can be incorporated in polymeric vinylidene chloride products or in polymeric vinyl chloride either by adding the plasticizer to the monomer or mixture of monomers prior to polymerization or by mixing them with the polymer product to form a plastic. When the new plasticizers and heat-stabilizing agents are added to the polymer material rather than to the monomers prior to polymerization, any of several methods may be employed to effect the mixing or compounding of the composition. For example, the polymer or co-polymer of vinylidene chloride or of vinyl chloride and the particular plasticizers to be employed may be ground together in a ball mill or other suitable mixer commonly employed in the plastics art or it may be added to the polymer on hot rolls in a manner similar to that employed in compounding rubber compositions. Alternatively, the plasticizers may be dissolved in a relatively volatile solvent and the solution and polymer masticated in known manner after which the volatile solvent may be removed by evaporation.

The materials which we prefer to employ are those members of the class described which are liquids at or near room temperature. It is not essential that they be liquid products, however, provided that the plasticizer is compatible with with the polymer and may be intimately dispersed therethrough.

It is to be understood that in the following claims, the expression "a polymeric product of a material selected from the group consisting of vinylidene chloride and vinyl chloride" is intended to signify not only the polymer of vinylidene chloride and that of vinyl chloride but also the co-polymers of these materials wherein vinylidene chloride or vinyl chloride constitutes a substantial proportion of the co-polymeric product.

Other modes of applying the principle of our invention may be employed instead of those explained, change being made as regards the materials employed, provided the ingredients stated by any of the following claims, or the equivalent of such stated ingredients be employed.

We therefore particularly point out and distinctly claim as our invention:

1. A composition of matter consisting on the solids basis essentially of (1) a polymeric product of a material selected from the group consisting of vinylidene chloride and vinyl chloride, plasticized with (2) a compound selected from the group consisting of di-aralkyl ethers of the benzene series and aralkyl ethers of nuclear hydroxylated aromatic compounds of the benzene series, to lower the softening point and to increase the toughness and resistance to thermal decomposition of the said polymer.

2. A composition of matter consisting on the solids basis essentially of (1) a polymeric product of a material selected from the group consisting of vinylidene chloride and vinyl chloride, plasticized with (2) between about 1 and about 40 per cent of a compound selected from the group consisting of di-aralykyl ethers of the benzene series and aralkyl ethers of nuclear hydroxylated aromatic compounds of the benzene series, to lower the softening point and to increase the toughness and resistance to thermal decomposition of the said polymer.

3. A composition of matter comprising a polymeric product of a material selected from the group consisting of vinylidene chloride and vinyl chloride plasticized with between about 1 and about 40 per cent of an aralkyl ether of a nuclear hydroxylated aromatic compound of the benzene series to lower the softening point and to increase the toughness and resistance to thermal decomposition of the said polymer product.

4. A composition of matter comprising a polymeric product of a material selected from the group consisting of vinyl chloride and vinylidene chloride plasticized with di-(alpha-phenyl-ethyl) ether to lower the softening point and to increase the toughness and resistance to thermal decomposition of the said polymer product.

5. A composition of matter comprising a polymeric product of a material selected from the group consisting of vinyl chloride and vinylidene chloride plasticized with an aralkyl ether of an ester of salicylic acid to lower the softening point and to increase the toughness and resistance to thermal decomposition of the said polymer product.

6. The method which comprises polymerizing a major amount of a material selected from the group consisting of vinylidene chloride and vinyl chloride, based on the weight of polymerizable material present, together with from 1 to 40 per cent of this weight of a compound selected from the group consisting of di-aralkyl ethers of the benzene series and aralkyl ethers of nuclear hydroxylated aromatic compounds of the benzene series, to provide a polymeric product of lowered softening point and of increased toughness and resistance to thermal decomposition.

7. The method which comprises polymerizing vinylidene chloride in the presence of di-(alpha-phenyl-ethyl) ether.

8. The method which comprises polymerizing vinylidene chloride in the presence of an aralkyl ether of an ester of salicylic acid.

9. The method which comprises mixing a polymeric product of a material selected from the group consisting of vinylidene chloride and vinyl chloride with from 1 to 40 per cent of its weight of a compound selected from the group consisting of di-aralkyl ethers of the benzene series and aralkyl ethers of nuclear hydroxylated aromatic compounds of the benzene series to produce a plastic of lowered softening point and of increased toughness and resistance to thermal decomposition.

10. The method which comprises mixing a polymeric vinylidene chloride product with from 1 to 40 per cent of its weight of di-(alpha-phenyl-ethyl) ether to produce a plastic of lowered softening point and of increased toughness and resistance to thermal decomposition.

11. The method which comprises mixing a polymeric vinyl chloride product with from 1 to 40 per cent of its weight of di-(alpha-phenyl-ethyl) ether to produce a plastic of lowered softening point and of increased toughness and resistance to thermal decomposition.

RALPH M. WILEY.
JOHN E. LIVAK.